US012638469B2

(12) United States Patent
Dono et al.

(10) Patent No.: US 12,638,469 B2
(45) Date of Patent: May 26, 2026

(54) MAGNETIC FIELD SPEED SENSOR OUTPUT SIGNAL PROTOCOL

(71) Applicant: Allegro MicroSystems, LLC, Manchester, NH (US)

(72) Inventors: Sarkis Dono, Ulm (DE); Syed Bilal Ali, Heidelberg (DE)

(73) Assignee: Allegro MicroSystems, LLC, Manchester, NH (US)

( * ) Notice: Subject to any disclaimer, the term of this patent is extended or adjusted under 35 U.S.C. 154(b) by 376 days.

(21) Appl. No.: 18/337,562

(22) Filed: Jun. 20, 2023

(65) Prior Publication Data

US 2024/0426862 A1     Dec. 26, 2024

(51) Int. Cl.
G01P 3/487 (2006.01)
G01P 3/489 (2006.01)

(52) U.S. Cl.
CPC .............. G01P 3/487 (2013.01); G01P 3/489 (2013.01)

(58) Field of Classification Search
CPC ................................. G01P 3/487; G01P 3/489
See application file for complete search history.

(56) References Cited

U.S. PATENT DOCUMENTS

| | | | |
|---|---|---|---|
| 6,542,847 B1 | 4/2003 | Lohberg et al. | |
| 6,687,644 B1 | 2/2004 | Zinke et al. | |
| 6,815,944 B2 | 11/2004 | Vig et al. | |
| 8,860,404 B2 | 10/2014 | Dwyer et al. | |

| | | | |
|---|---|---|---|
| 9,068,859 B2 | 6/2015 | Dwyer et al. | |
| 9,151,771 B2 | 10/2015 | Vig et al. | |
| 9,222,990 B2 | 12/2015 | Dwyer et al. | |
| 9,970,996 B2 | 5/2018 | Fernandez et al. | |
| 10,216,559 B2 | 2/2019 | Fernandez | |
| 10,436,606 B2 | 10/2019 | Kerdraon et al. | |
| 10,473,486 B2 | 11/2019 | Doogue et al. | |
| 10,495,485 B2 | 12/2019 | Burdette et al. | |
| 10,495,700 B2 | 12/2019 | Prentice et al. | |
| 10,571,301 B2 | 2/2020 | Doogue et al. | |
| 10,598,514 B2 | 3/2020 | Pepka et al. | |
| 10,656,170 B2 | 5/2020 | Lim et al. | |
| 10,782,366 B2 | 9/2020 | Stewart | |
| 11,686,597 B2 | 6/2023 | Weiland et al. | |

(Continued)

OTHER PUBLICATIONS

U.S. Appl. No. 17/663,930, filed May 18, 2022, Friedrich, et al.

(Continued)

*Primary Examiner* — Reena Aurora
(74) *Attorney, Agent, or Firm* — DALY, CROWLEY, MOFFORD & DURKEE, LLP

(57) ABSTRACT

A magnetic field speed sensor includes one or more magnetic field sensing elements to generate a magnetic field signal indicative of a magnetic field associated with a moveable target and a controller to generate a controller output signal including a plurality of output words, each including a speed pulse and a plurality of data pulses capable of having four different amplitudes. The time between the speed pulses of consecutive output words is indicative of the speed of movement of the target. Each data pulse corresponds to a data bit having a binary value represented by a transition direction of the data pulse and the amplitude of the data pulse. Features include a programmable data pulse width or an adaptively adjustable data pulse width to avoid truncation.

22 Claims, 9 Drawing Sheets

(56)  References Cited

U.S. PATENT DOCUMENTS

| 12,107,672 | B1 * | 10/2024 | Hui ........................ H04J 3/0667 |
| 12,407,549 | B2 * | 9/2025 | Halawani ............ H04L 25/4902 |
| 2007/0118327 | A1 | 5/2007 | Courtney |
| 2010/0026279 | A1 * | 2/2010 | Vig ......................... G01P 3/488 |
| | | | 324/173 |
| 2012/0007589 | A1 | 1/2012 | Okada |
| 2020/0088550 | A1 | 3/2020 | Lorber et al. |

OTHER PUBLICATIONS

Allegro MicroSystems Application Note "AN296246, Speed Sensor Protocols", Allegro MicroSystems, Aug. 2, 2021, 11 pages.
Allegro MicroSystems Datasheet "A19350 High-Accuracy GMR Wheel Speed and Direction Sensor IC"; Allegro MicroSystems, Nov. 16, 2018; 14 Pages.
Allegro MicroSystems Datasheet "A19360 High-Resolution GMR Wheel Speed and Distance Sensor IC", Allegro MicroSystems, Dec. 6, 2022, 18 pages.
U.S. Notice of Allowance dated Sep. 10, 2025 for U.S. Appl. No. 18/435,241; 10 Pages.

* cited by examiner

300 ⟶

400 ⟶

MAGNETIC FIELD SPEED SENSOR OUTPUT SIGNAL PROTOCOL

BACKGROUND

As is known, sensors are used in various types of devices to measure and monitor properties of systems in a wide variety of applications. For example, sensors have become common in products that rely on electronics in their operation, such as automotive control systems. Examples of automotive applications are detection of wheel speed for anti-lock braking systems and four-wheel steering systems, and the speed and direction of transmission gears.

Some sensors monitor properties by detecting a magnetic field associated with proximity or movement of a target object with respect to one or more magnetic field sensing elements. In an automotive application, the sensor output signals can be coupled to an engine control unit (ECU) for further processing, such as detection of gear or wheel speed, direction and/or vibration.

FIG. 1 shows a known system 10 for detecting rotation of a target 12, such as a wheel. The system 10 includes a sensor 14 having one or more magnetic field sensing element 16a-16d. As the target 12 rotates, target features such as alternating north and south magnetic poles are presented to the sensor 14, which generates pulses 24. By detecting the timing these "speed pulses" 24, the ECU can determine the speed of the target.

More particularly, as the target 12 passes the sensor 14, the magnetic profile 18 associated with the passing magnetic poles causes a magnetic field signal 20 to be generated. Comparison of the magnetic field signal 20 to a threshold (e.g., an operate threshold Bop and a release threshold $B_{RP}$) causes a channel signal 22 to be generated. In some examples, speed pulses 24 can coincide with transitions of the channel signal 22, as shown. Additional data 26 can be communicated between speed pulses 24, as shown. It will be appreciated that the sensor 14 can include any number of sensing elements and that the detected magnetic field can be an absolute magnetic field detected by a single element or a differential magnetic field between two sensing elements.

The additional data 26 between speed pulses 24 can be communicated in various formats, such as the data bits of the "AK-protocol" as shown in FIG. 2. Each message can be called a "word" and is generally composed of a high-current speed pulse to indicate target speed, followed by medium or lower current data pulses; see U.S. Pat. Nos. 6,542,847 and 6,687,644. The speed pulse has a width $t_p$=50 μs (microseconds), and there are gaps of $t_p/2$=25 μs between the speed pulse and surrounding data pulses. Each data pulse, in turn, uses $t_p$=50 μs of time. The data pulses are Manchester encoded with the bit information contained in the edge of the signal within a certain time window, $t_p$. A data bit having a central falling edge can be read as having the value "0" while a data bit having a central rising edge is read as having the value "1".

It will be appreciated that as the target object 12 rotates faster (e.g., as a vehicle accelerates), the magnetic poles are presented to the sensor 14 with increasing frequency, and the gap between the speed pulses 24 (and their subsequent data messages 26) decreases. This increase in data frequency can lead to truncation of data bits on the AK-protocol, thereby losing information transmitted on the data bits. When the ECU receives truncated data, it has less information to apply to computations relating to vehicle safety, and the latter is correspondingly diminished.

Speed sensors may communicate with the ECU through a two-wire, digital, current level protocol; that is, the two connections providing power to the speed sensor are used to communicate data to the ECU by varying the current level according to discrete thresholds. Alternatively, speed sensors may communicate with the ECU through a three-wire interface in which a dedicated connection is used to communicate data rather than the power connections.

SUMMARY

The present disclosure provides a magnetic field speed sensor output signal protocol with which speed and other data is encoded and decoded without reliance on the timing of signal edges. With the described arrangements, decoding of the sensor output signal is simpler and faster than heretofore possible. Truncation can be avoided by programming pulse duration or by an adaptive process by which the pulse duration is adjusted based on target speed.

According to the disclosure, a magnetic field speed sensor includes a magnetic field sensing element operable to generate a magnetic field signal indicative of a magnetic field associated with a moveable target and a controller responsive to the magnetic field signal and configured to generate a controller output signal including a plurality of output words, each output word including a speed pulse and a plurality of data pulses capable of having four different amplitudes, wherein a time between the speed pulses of consecutive output words is indicative of the speed of movement of the target. Each data pulse corresponds to a data bit having a binary value represented by a transition direction of the data pulse and the amplitude of the data pulse.

Features of the disclosure may include one or more of the following, alone or in combination. A duration of each of the data pulses may be programmable. A duration of each of the data pulses may be adjustable based on the speed of movement of the target. The binary value of each data bit may be independent of a time measurement. The binary value of each data bit may be determined based on a comparison of the amplitude of the data pulse to a high threshold level, a medium threshold level, and a low threshold level. Each data bit may be associated with one or more of a direction of movement of the target, an air gap associated with the target, a temperature, and a fault condition associated with the sensor. The controller can include an encoder configured to compare the magnetic field signal to a threshold to generate the speed pulses and configured to generate the data pulses at an amplitude associated with a status received from one or more monitoring circuits or diagnostic circuits. An output signal generator may be configured to generate a sensor output signal as a current on a power connection of the sensor based on the controller output signal. The magnetic field speed sensor can further include an output signal generator configured to generate a sensor output signal as a voltage on an output pin of the sensor based on the controller output signal. The magnetic field sensing element may include a first magnetic field sensing element and the magnetic field signal includes a first magnetic field signal and wherein the magnetic field speed sensor further includes a second magnetic field sensing element operable to generate a second magnetic field signal, wherein the controller output signal is based on the first magnetic field signal and the second magnetic field signal. The magnetic field sensing element may include one or more Hall effect elements or magnetoresistance elements. The magnetic field speed sensor may include a back bias magnet to generate a magnetic field, wherein the target includes a ferromagnetic object and wherein movement of the target affects the magnetic field detected by the magnetic field sensing element. A duration of the speed pulse may be programmable. A duration of the speed pulse may be adjustable based on the speed of movement of the target.

Also described is a method of communicating an output signal of a magnetic field speed sensor including generating a magnetic field signal indicative of a magnetic field associated with a target, generating a controller output signal including a plurality of output words, each output word including a speed pulse and a plurality of data pulses capable of having four different amplitudes, generating a sensor output signal based on the controller output signal, and determining a binary value of each data bit represented by a transition direction of the data pulse and the amplitude of the data pulse.

Features may include one or more of the following, alone or in combination. The method may further include programming a duration of each of the data pulses. The method may further include adaptively adjusting a duration of each of the data pulses based on the speed of movement of the target. Generating the controller output signal may include comparing the magnetic field signal to a threshold to generate the speed pulses. Generating the controller output signal may include responding to one or more monitoring circuits and one or more diagnostic circuits to generate the plurality of data pulses. Generating the sensor output signal may include applying a current to a power connection of the magnetic field speed sensor based on the controller output signal. Generating the sensor output signal may include applying a voltage to an output pin of the sensor based on the controller output signal. Determining the binary value of each data bit may include comparing the amplitude of the data pulse to a high threshold level, a medium threshold level, and a low threshold level.

It is appreciated that the concepts, techniques, and structures disclosed herein may be embodied in other ways, and that the above summary of disclosed embodiments is thus meant to be illustrative rather than comprehensive or limiting. In particular, individual elements of different embodiments described herein may be combined to form other embodiments not specifically set forth above. Various elements, which are described in the context of a single embodiment, also may be provided in other embodiments separately, or in any suitable subcombination. Moreover, other embodiments not specifically described herein also may be within the scope of the claims set forth below.

BRIEF DESCRIPTION OF THE DRAWINGS

The foregoing features of the disclosure, as well as the disclosure itself may be more fully understood from the following detailed description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

Figure 1:
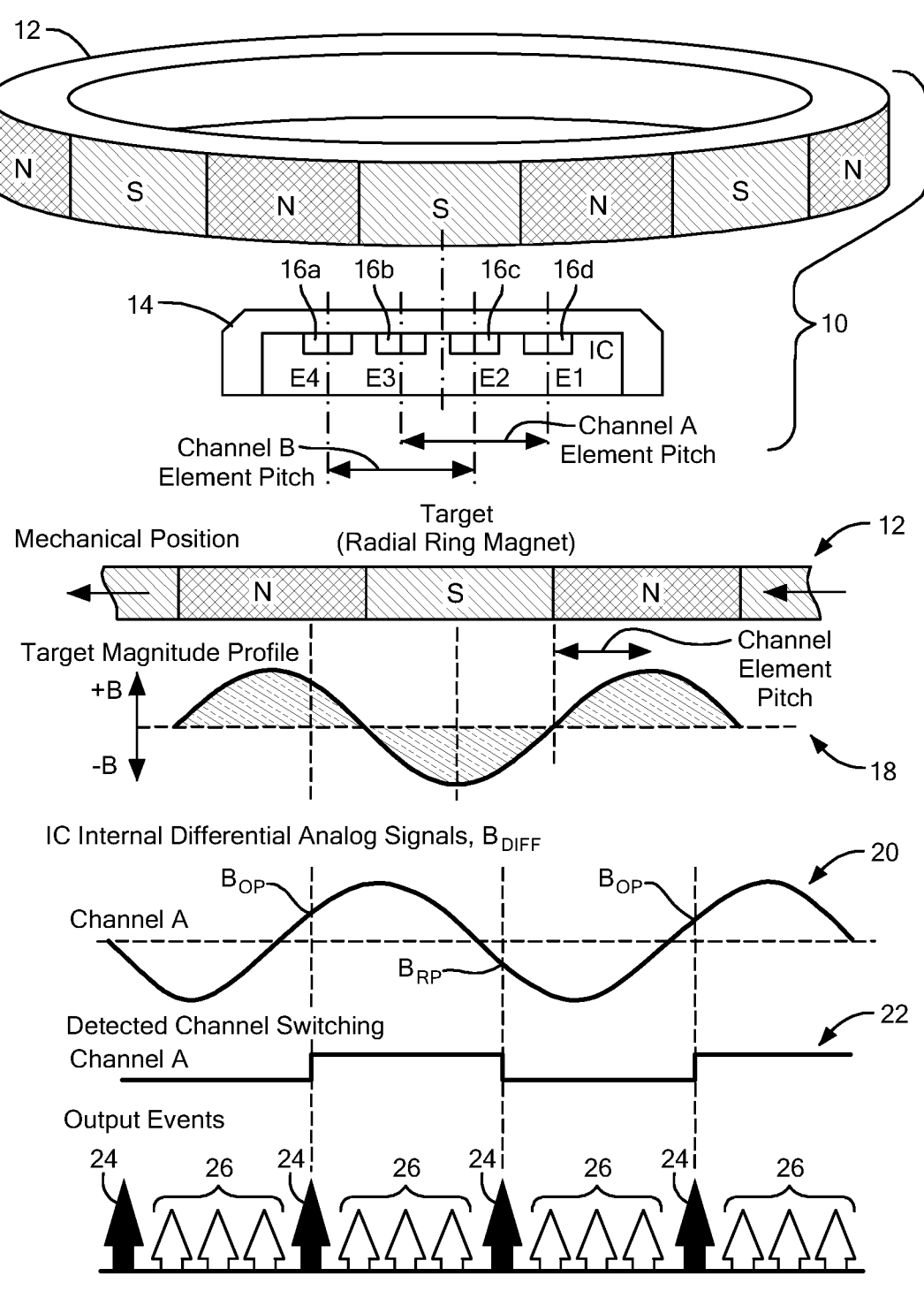
FIG. 1 shows a known magnetic field speed sensor system and associated signals including sensor output signals.
Figure 2:
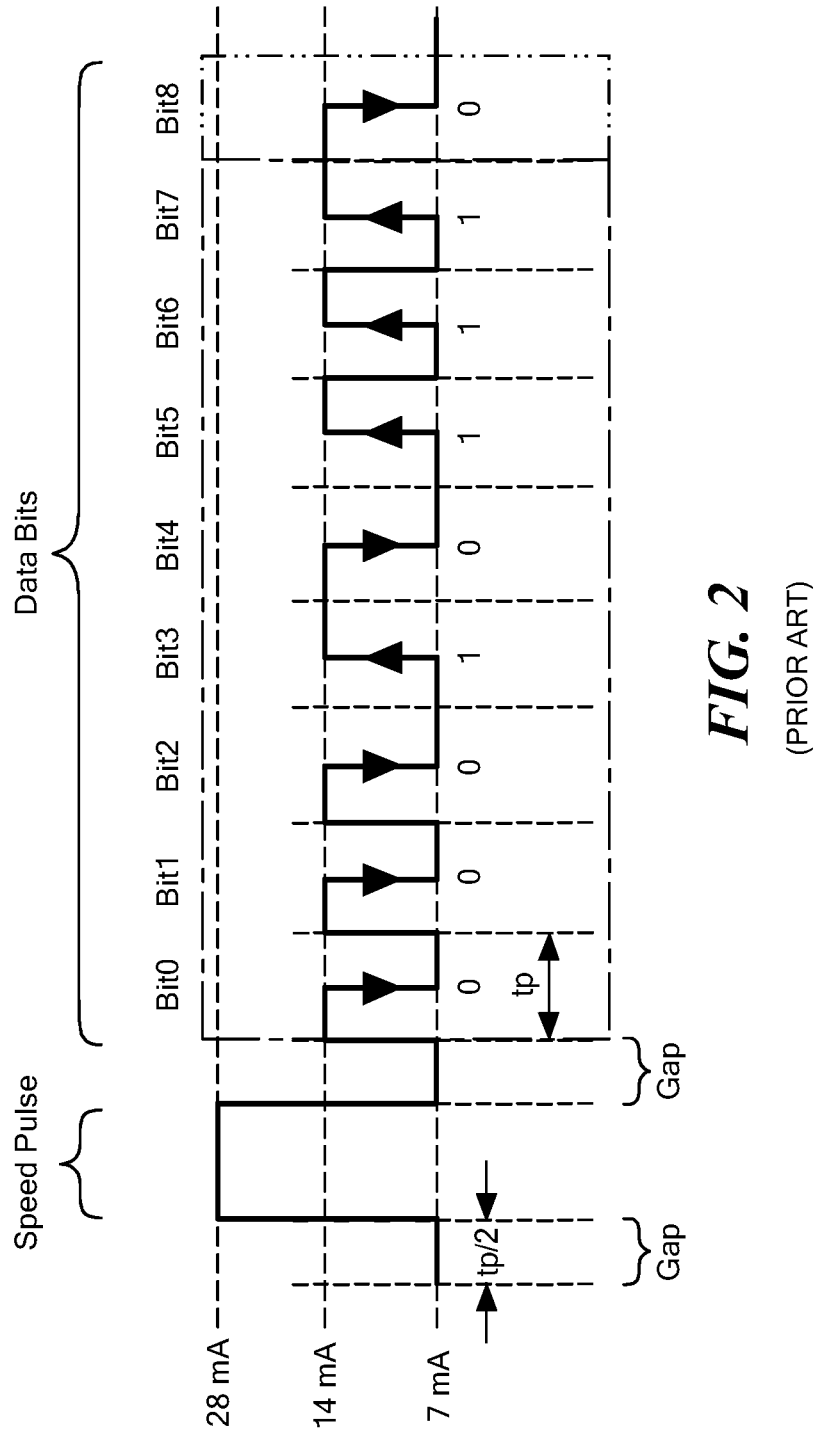
FIG. 2 shows a packet of data having digital electrical pulses according to a known data protocol (the "AK" protocol)
Figure 3:
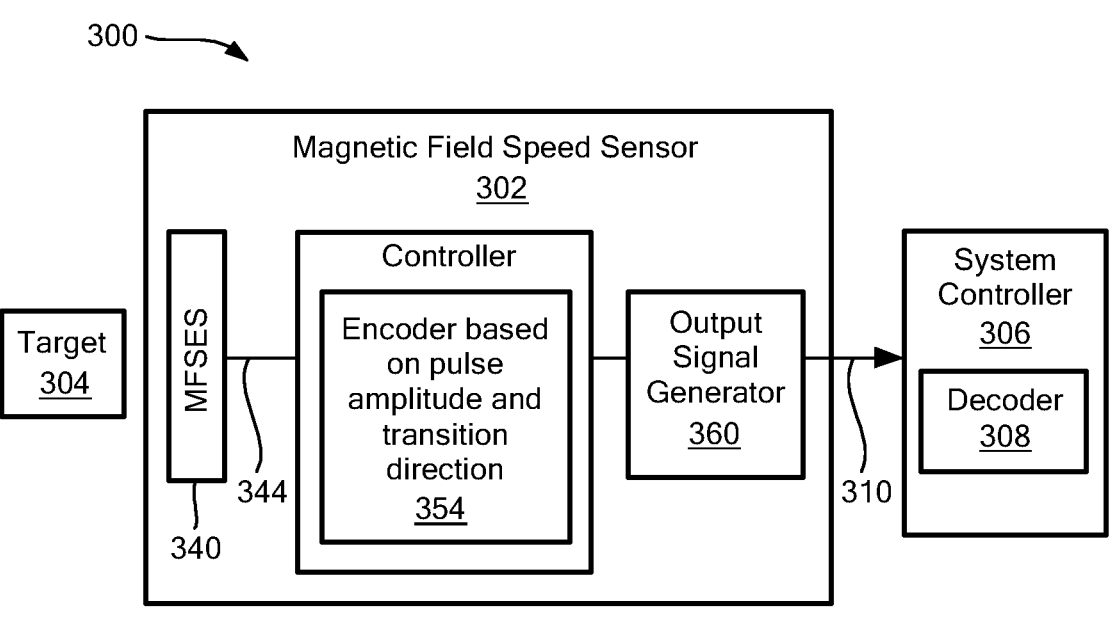
FIG. 3 shows a block diagram of a magnetic field speed sensor system according to the disclosure.

Referring to FIG. 3, a magnetic field speed sensor system 300 includes a magnetic field speed sensor 302 as may take the form of a rotation detector that can be used, for example, to detect a target 304 that is moveable with respect to the sensor 302. The sensor 302 includes one or more magnetic field sensing elements 340 operable to generate one or more magnetic field signals 344 indicative of a magnetic field associated with the target 304 and a controller 350 responsive to the magnetic field signal and configured to generate a controller output signal 356. An output signal generator 360 is configured to generate a sensor output signal 310 in response to the controller output signal 356.

Figure 4:
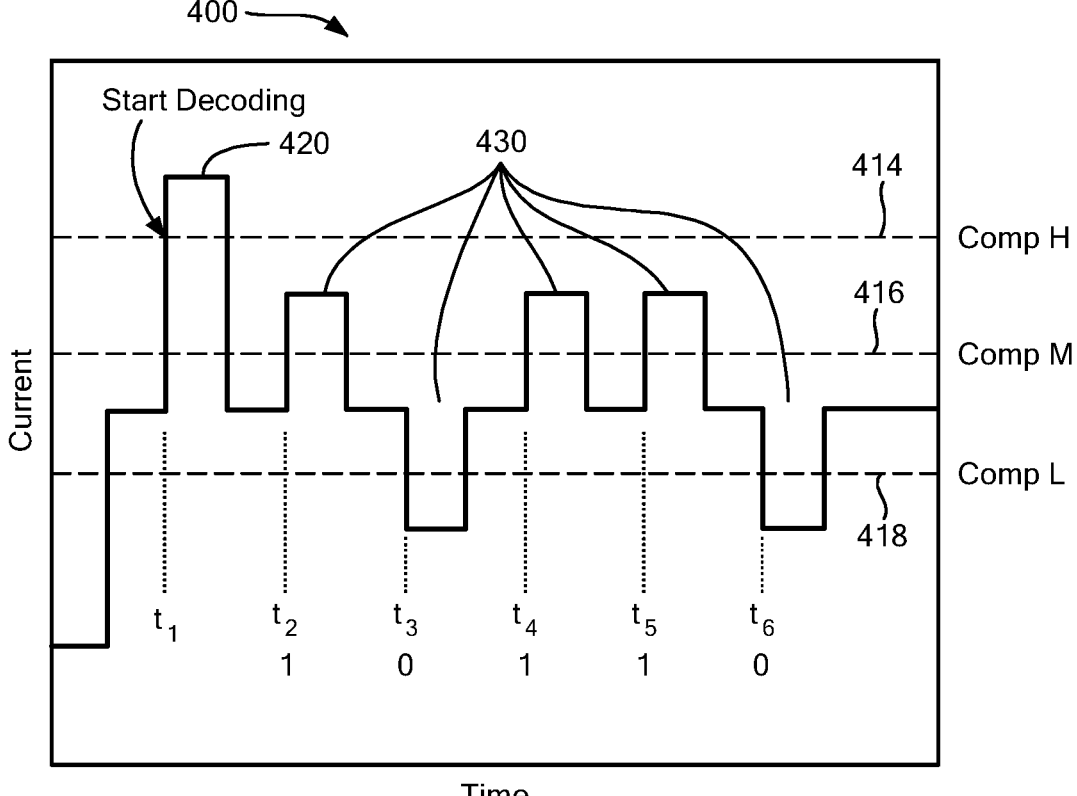
FIG. 4 shows a sensor output signal word according to the disclosure.
Figure 5:
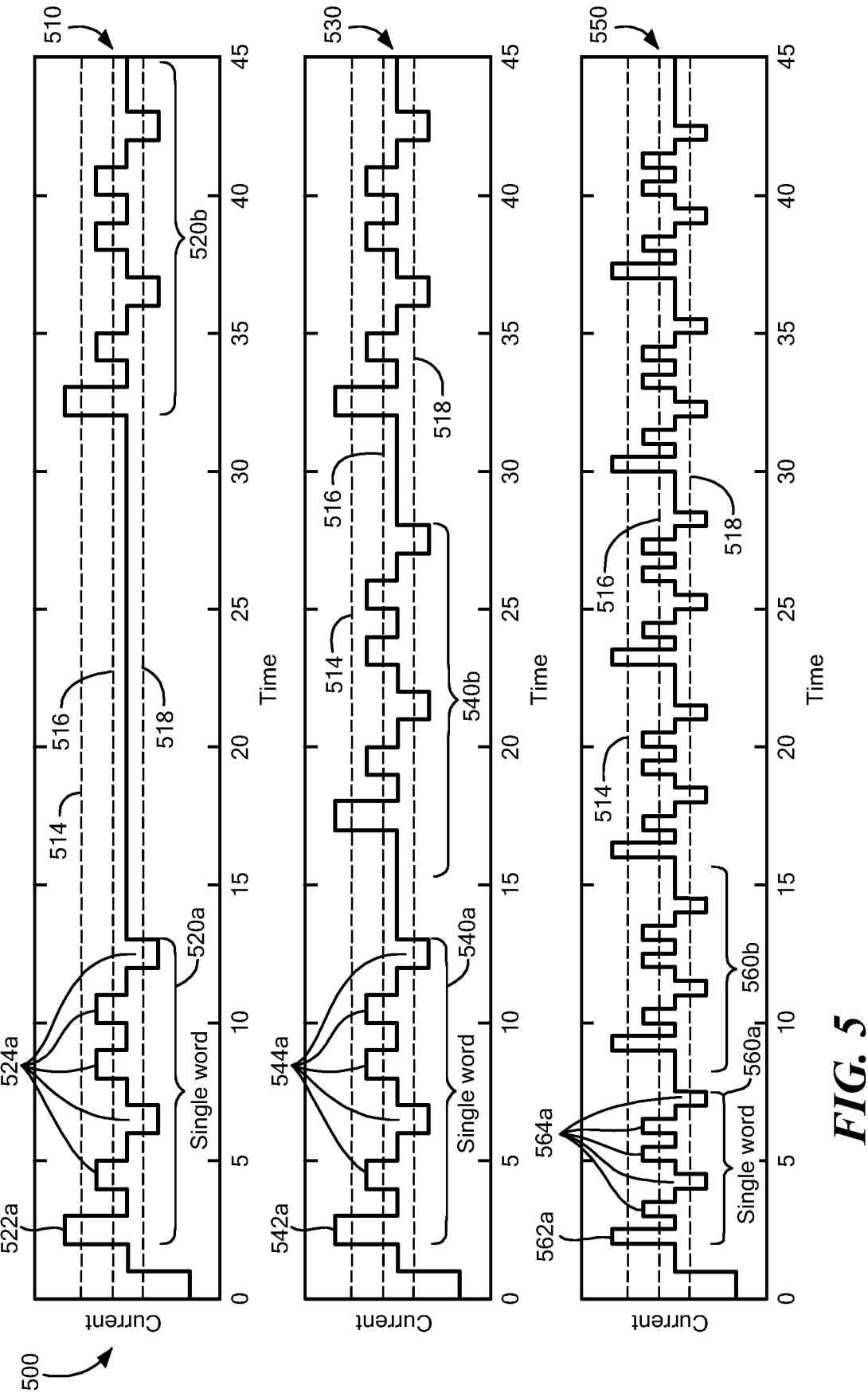
FIG. 5 shows example sensor output signals under various target speed conditions according to the disclosure.

The sensor output signal 310 is provided in the form of pulses that form digital words, or data packets. An example word 400 is shown in FIG. 4. Sensor output signal 310 includes a plurality of such words 400 (e.g., as shown in FIG. 5). For example, each target feature that passes sensor 302 (e.g., a gear tooth, valley, or a magnetic pole), can correspond to a word 400.

Figure 8:
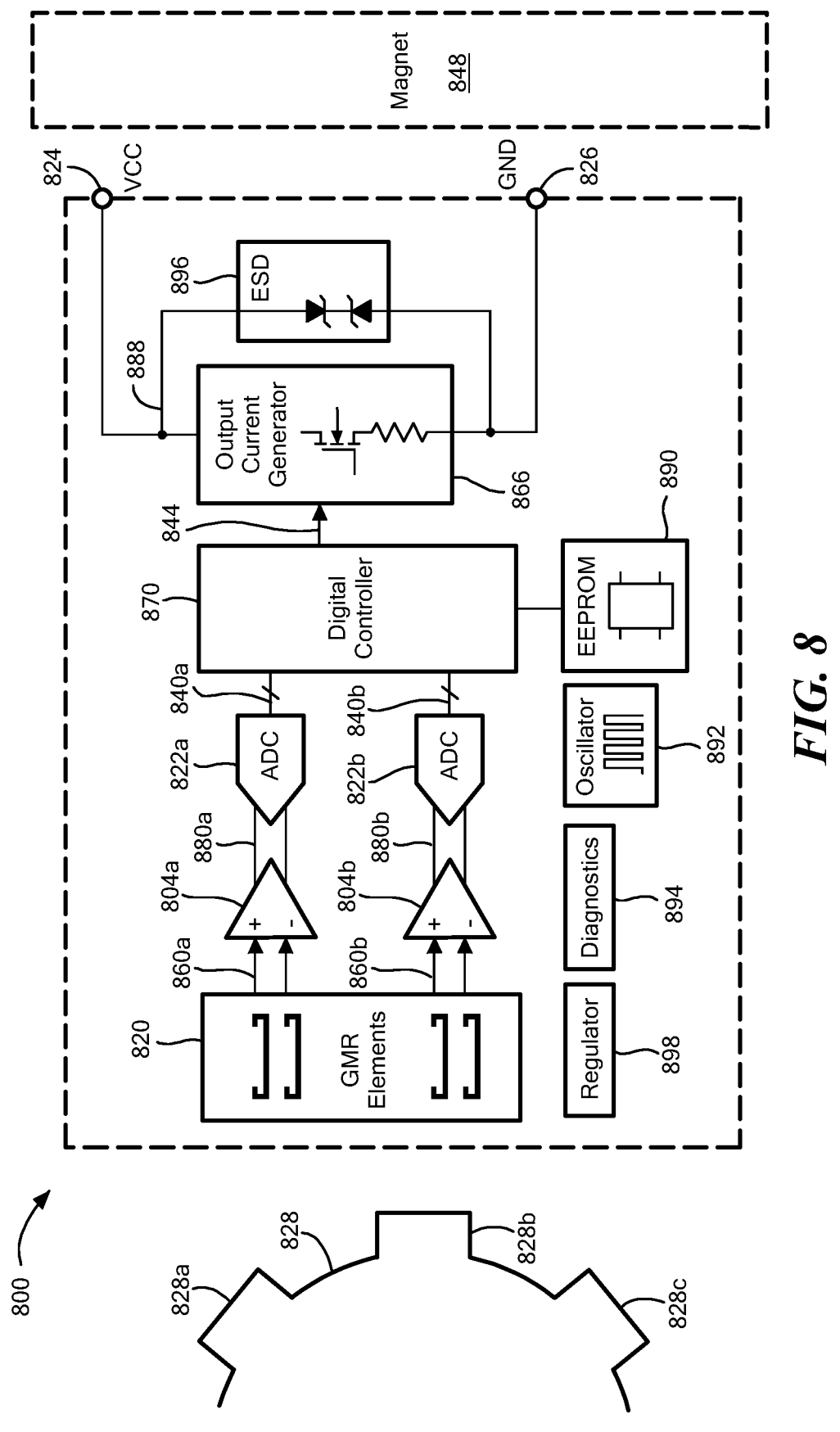
FIG. 8 is a block diagram of an example magnetic field speed sensor implementing a two-wire output signal protocol.
Figure 9:
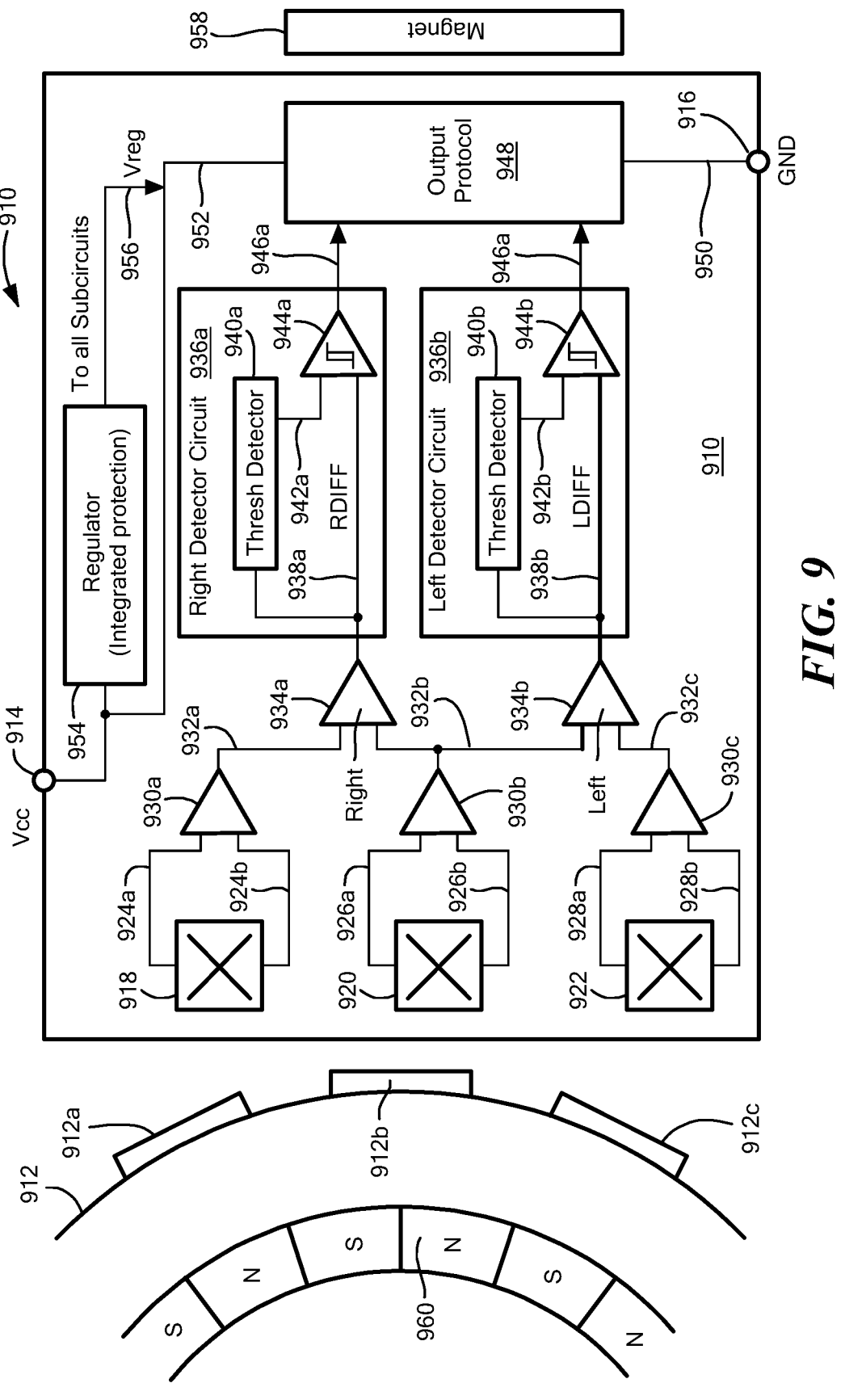
FIG. 9 is a block diagram of an example magnetic field speed sensor implementing a three-wire output signal protocol.

In some embodiments, the sensor output signal 310 can be communicated as a current on a power connection of the sensor 302 in a two-wire output configuration, an example of which is shown in FIG. 8. In some embodiments, the sensor output signal 310 can be communicated as a voltage on an output pin of the sensor 302 in a three-wire output configuration, an example of which is shown in FIG. 9.

Referring also to FIG. 4, example sensor output signal word 400 has a vertical axis in arbitrary units of current, such as milliamperes, and a horizontal axis in arbitrary units of time, such as microseconds. The output word 400 includes a speed pulse 420 and a plurality of data pulses 430 capable of having four different amplitudes. The time between speed pulses 420 of consecutive output words is indicative of the speed of the target 304 and additional information is encoded in the data pulses 430. Such additional information can include, but is not limited to, one or more of the following parameters: target movement direction, airgap, temperature, and a fault condition. To this end, sensor 302 can include one or more monitoring or diagnostic circuits.

Each data pulse 430 corresponds to a data bit having a binary value represented by a transition, or edge direction of the data pulse and the amplitude of the data pulse. The number of data pulses 430 in a word 400 can be fixed. As used herein, the term "pulse" is used to describe a signal that begins at a first level or state, transitions rapidly to a second level or state different than the first level and returns rapidly to the first level.

The controller 350 includes an encoder 354 configured to compare the magnetic field signal 344 to one or more thresholds to generate speed pulses 420. The controller 350 further generates the data pulses 430 at an amplitude associated with a status received from one or more monitoring circuits or diagnostic circuits.

A system controller 306 is configured to receive the sensor output signal 310 and to decode the received signal with a decoder 308. The system controller 306 can take the form of an external processor with which the pulses of signal 310 are decoded and further processed. For example, in an automotive application, the system controller 306 can take the form of an engine control unit (ECU).

Decoding can be accomplished by comparing the received signal 310 to three threshold levels. Here, the binary value of each data bit is determined by comparison of the amplitude of the data pulse to a high threshold level (Comp H 414), a medium threshold level (Comp M 416), and a low threshold level (Comp L 418). According to an example decoding process, when a rising edge crosses Comp H 414, decoding begins. For every next rising edge that crosses Comp M 416, a "1" is decoded and for every next falling edge that crosses Comp L 418, a "0" is decoded until the correct number of bits in the word 400 are decoded, after which decoding stops until the next rising edge crosses Comp H 414 so the next word can be decoded. Each data pulse of the word 400 corresponds to a single bit and thus, by "next" it is meant that a next transition or edge following completion of a pulse. Thus, in the example word 400 of FIG. 4, decoding begins at time t1 when a rising edge of the signal 310 crosses Comp H 414. For every next rising edge that crosses Comp M 416, a "1" is decoded, as here occurs at times t2, t4, and t5. And for every next falling edge that crosses Comp L 418, a "0" is decoded, as here occurs at times t3 and t6. The threshold levels Comp H 414, Comp M 416, and Comp L 418 can be selected to be between the nearest output levels, or signal amplitudes. For example, the Comp H 414 level can be selected to be between the highest signal level (as shown at label 420) and the next highest signal level (as shown by the first lead line from label 430). I With this arrangement, the magnetic field speed sensor output signal protocol with which speed and other target data is encoded and decoded is independent of the timing of signal edges. Stated differently, the binary value of each data bit 430 is independent of a time measurement. As a result, decoding of the sensor output signal 310 containing one or more words 400 is simpler and faster than heretofore possible.

The pulse duration, or pulse width of the speed pulses 420 and data pulses 430 can be a preset, or predetermined, fixed value, for example as may be established during manufacture and/or installation. Alternatively, according to an aspect of the disclosure, the pulse width can be varied in order to avoid data truncation at higher target speeds. It will be appreciated by those of ordinary skill in the art that the pulse widths of one or both of the speed pulses 420 and data pulses 430 can be varied. This feature is possible because decoding the described output signal protocol does not depend on time measurements and thus, is independent of pulse duration.

Varying the width, or duration of the pulses 420, 430 can be achieved by a programmable feature of the sensor 302. For example, the pulse duration can be programmed by a user into memory of the sensor 302 based on a factors including specified maximum target speed in a given application a number of teeth or pole-pairs of the target 304 and the number of data bits within a word.

The duration of pulses 420, 430 can be varied by an adaptive pulse duration feature by which the pulse duration is adjusted based on target speed. In particular, the sensor 302 can detect target speed (i.e., time between consecutive speed pulses) and the pulse duration can be computed based on the target speed and the number of data bits 430 in each word, as will be explained. This adaptive feature can run periodically during sensor operation. Alternatively, a look up table can be used to store a plurality of target speed ranges and corresponding pulse durations for each such range. During sensor operation, a speed detector can periodically detect the target speed and the look up table can be used to determine pulse duration.

Referring to FIG. 5, adjustable pulse durations are shown in connection with example sensor output signals 500 including signals 510, 530, 550 that correspond to different target speed conditions. The pulse durations in signals 510, 530, 550 can result from user programming of the pulse duration or from an adaptive feature by which the pulse duration changes based on target speed.

Signal 510 can correspond to a first relatively slow target speed, signal 530 can correspond to an intermediate target speed, and signal 550 can correspond to relatively fast target speed. Also shown in connection with each sensor output signal 510, 530, 550 are the three threshold levels 514 (e.g., Comp H), 516 (e.g., Comp M), 518 (e.g., Comp L) that are compared to the sensor output signal for decoding.

Referring to output signal 510, each data word, as labeled in connection with the first data word 520a, includes a speed pulse 522a and data pulses 524a, each having a pulse duration on the order of approximately one microsecond. The first data word 520a is spaced from a second data word 520b by approximately twenty microseconds. Under this target speed condition, there is no data truncation since there is ample time to communicate the entire data word 520a before the next data word 520b is communicated.

In output signal 530, each data word, as labeled in connection with the first data word 540a, includes a speed pulse 542a and data pulses 544a, each having a pulse duration on the order of approximately one microsecond. The first data word 540a is separated from a second data word 540b by only approximately four microseconds. Here again, there is no data truncation as there is ample time to communicate the entire data word 540a before the next data word 540b is communicated and therefore the pulse durations in data words 540a, 540b can be the same as the pulse duration in data words 520a, 520b even though the target speed illustrated by output signal 530 is faster than the target speed illustrated by output signal 510 and thus, the data words 540a, 540b are closer together than the data words 520a, 520b.

In output signal 550 each data word, as labeled in connection with the first data word 560a, includes a speed pulse 562a and data pulses 564a. Output signal 550 illustrates a condition in which the target is moving at an even faster speed than illustrated by signal 530, which faster speed would result in data truncation if the pulse durations were kept the same as in signals 510, 530. Under this faster target speed condition, the pulse duration is reduced as compared to signals 510 and 530, such as to a pulse width on the order of 0.5 microseconds, thereby also reducing the duration of the data words 560a, 560b. As a result of the shorter pulse and word durations, data truncation is avoided, as shown and there is approximately one microsecond of spacing between the data words 560a, 560b. It will be appreciated that if the pulse duration in signal 550 were not reduced, then the data words 560a, 560b would be longer and there would not be ample time to communicate all of the data bits of a word before the next word is communicated.

Figure 6:
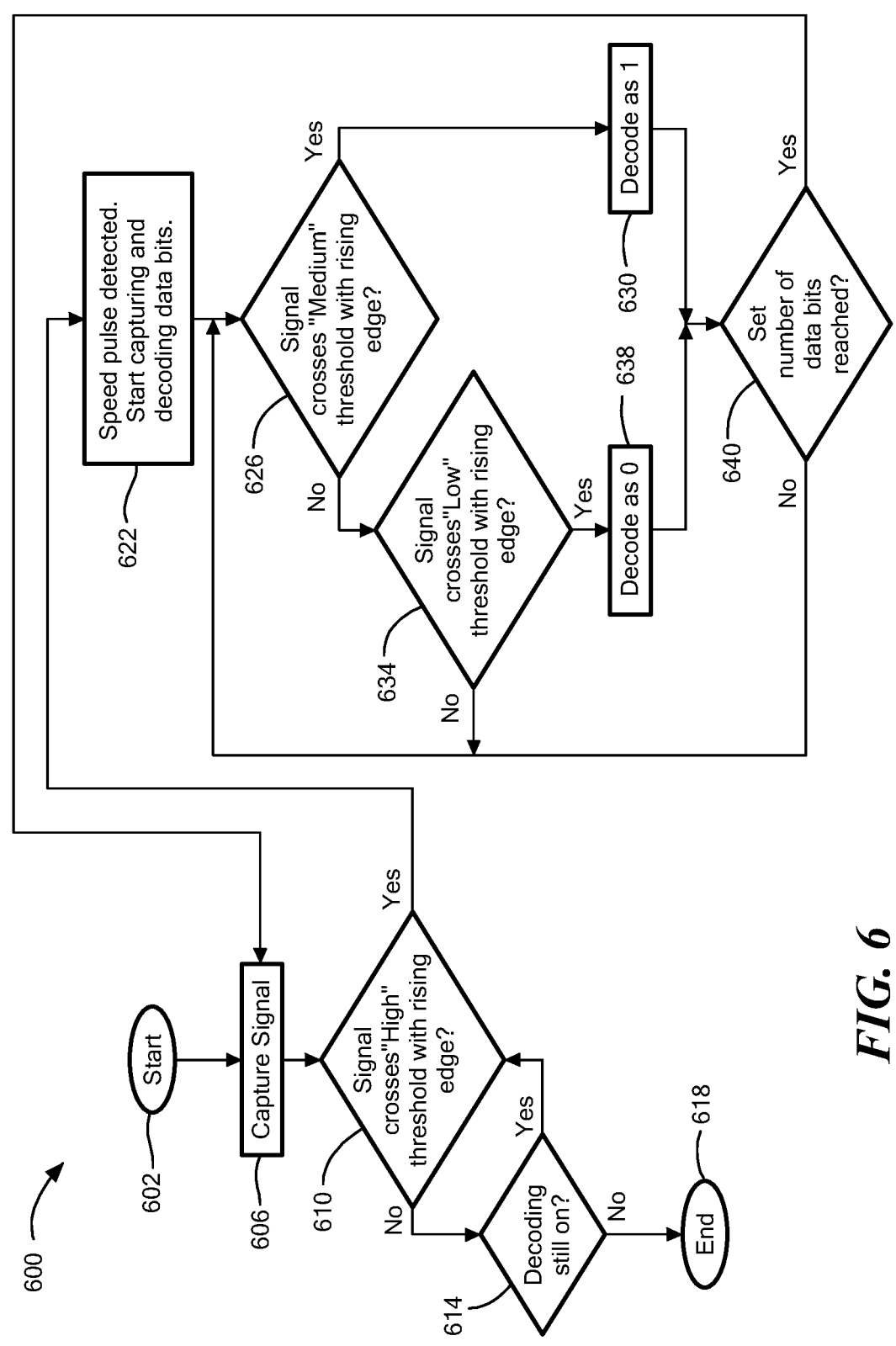
FIG. 6 is a flow diagram illustrating decoding of a sensor output signal according to the disclosure.

Referring to FIG. 6, a flow diagram illustrates decoding of a sensor output signal 310 of the above-described format according to the disclosure. Decoding is described in connection with example word 400 of a sensor output signal 310, which sensor output signal contains a plurality of such data words, such as shown in the example signals of FIG. 5.

Decoding commences at block 602, such as based on a rising edge of the sensor output signal crossing the Comp H 414 threshold. At block 606, the sensor output signal 310 is captured by the controller 350.

At decision block 610, it is determined if a rising edge of the signal 310 has crossed the Comp H threshold 414. If a rising edge of the signal 310 has not crossed the Comp H threshold 414, then at block 614, it is determined if decoding is still active. For example, decoding can be determined to still be active if a subsequent rising edge of the signal 310 has not crossed the Comp H threshold 414. If decoding is still active, then the process returns to block 610; whereas, if decoding is not active, decoding terminates at block 618.

If, at block 610, a rising edge of signal 310 has crossed the Comp H threshold 414, then at block 622, a speed pulse 420 is detected (e.g., at time t1 in FIG. 4) and the controller 350 begins capturing and decoding data bits 430.

At block 626, it is determined whether a rising edge of signal 310 has crossed the Comp M threshold 416. If a rising edge of signal 310 has crossed the Comp M threshold 416, then at block 630, a data bit value of "1" is decoded. Alternatively, if a rising edge of signal 310 has not crossed the Comp M threshold 416, then it is determined at block 634 whether a falling edge of the signal 310 has crossed the Comp L threshold 418.

If a falling edge of the signal 310 crossed the Comp L threshold 418, then at block 638, a data bit value of "0" is decoded. Following blocks 630 and 638, it is determined at block 640 whether the predetermined number of data bits included in a data word (e.g., five bits in the example data word 400 of FIG. 4) have been decoded. If the predetermined number of data bits has been decoded, then the process 600 returns to block 606. Alternatively, if the predetermined number of data bits has not been decoded, then the process returns to block 626, as shown.

It will be appreciated by those of ordinary skill in the art that the above-described encoding and decoding can be varied in ways that do not affect the advantages. For example, the polarity of the data bits can be inverted (e.g., decoding of a bit value of "1" can instead be decoded as a bit value of "0" and visa versa). Further, certain aspects of the sensor output signal, can be varied. For example, the levels of the thresholds 414, 416, 418 can be varied. Also, the sensor output signal pulses can be capable of having more than four different amplitudes.

Figure 7:
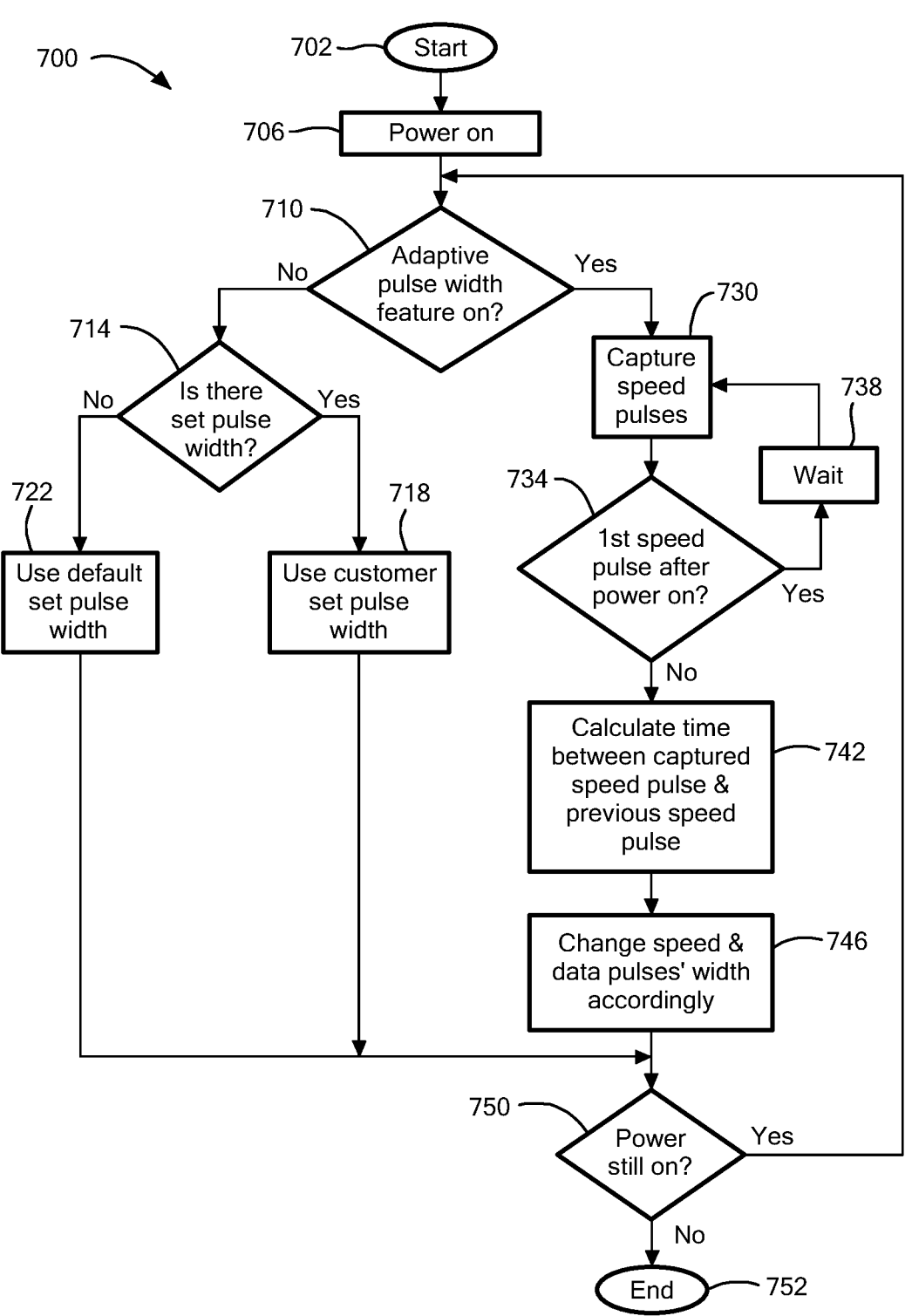
FIG. 7 is a flow diagram illustrating data pulse width determination according to the disclosure.

Referring to FIG. 7, a flow diagram illustrates a process for pulse width determination according to the disclosure. The process commences at block 702 with the sensor 302 being powered on at block 706. At block 710, it is determined if an adaptive pulse width feature is active.

If the adaptive pulse width feature is not active, then at block 714, it is determined if a pulse width has been programmed into the sensor, as may be determined by checking a register value. If the pulse width has been programmed, then at block 718, the programmed pulse width is used by the output signal generator 360 in setting the pulse width of pulses in the output signal words. Alternatively, if it is determined at block 714 that the sensor does not contain a set, programmed pulse width, then at block 722, a default pulse width, as may be preset during manufacture, can be used.

If the adaptive pulse width feature is active at block 710, then at block 730, speed pulses are captured as may occur in response to a rising edge crossing Comp H 414. At block 734, it is determined whether the captured speed pulse 420 is the first speed pulse occurrence after power on block 706. If the captured speed pulse is the first speed pulse to occur after power on, then at block 742, a time between the captured speed pulse and the previous speed pulse is calculated in order to thereby determine the target speed. At block 746, the pulse width of the data pulses 430 is changed accordingly. In an example pulse width computation, where $T_i$ is the measured time between speed pulse $P_i$ and the previous speed pulses $P_{i-1}$ and N is the set number of data bits in each word, the pulse width $W_i$ can be computed as $T_i/(1+N+x)$, where x is a small integer value that can be added to ensure that there is enough time between last data bit of one word and the speed pulse of consecutive word.

At block 750, it is determined whether sensor 302 power is still on. If power is still on, then the process returns to block 710 and if sensor power is off, then the pulse width determination process terminates at block 752, as shown.

Referring to FIG. 8, a magnetic field sensor 800 as may implement the above-described output signal protocol includes at least one magnetic field sensing element 820 configured to generate differential magnetic field signals 860a, 860b, indicative of a magnetic field associated with a target 828. Sensing elements 820 can take a variety of forms, such as the illustrated GMR yokes as may be arranged in one or more bridge or other configurations in order to generate one or more single-ended or differential signals indicative of the sensed magnetic field. Two differential magnetic field signals 860a, 860b are shown with their corresponding processing channels. It will be appreciated that the sensing elements 820 may produce more or fewer differential magnetic field signals, and thus that the depiction of two such channels in FIG. 8 is not limiting.

Each of the magnetic field signals 860a, 860b is coupled to a respective processing channel that can include an amplifier (i.e., front end amplifier) 804a, 804b and an analog-to-digital converter (ADC) 822a, 822b. Output signals 880a, 880b of the amplifiers 804a, 804b can be adjusted for gain and/or offset. The ADCs 822a, 822b may take various forms and may include one or more filters, such as a low pass filter and/or notch filter, and as may take the form of a sigma-delta modulator to generate respective digital magnetic field signals 840a, 840b.

Digital magnetic field signals 840a, 840b can be coupled to a digital controller 870 for processing. Digital controller 870 can be the same as or similar to controller 350 of FIG. 3.

Digital controller 870 processes the digital magnetic field signals 840a, 840b to determine the speed, position, and/or direction of movement, such as rotation of target 828. Controller 870 can combine this information with fault or other diagnostic information to output one or more digital signals 844 (that may be the same as or similar to signal 356) to output signal generator 866 (that may be the same as or similar to output signal generator 360). Output signal generator 866 encodes the information provided by controller output 870 (e.g., speed and/or direction information) in the above-described manner to provide the sensor output signal

888 (that may be the same as or similar to output signal 310) in the above-described format.

Output signal generator 866 provides the sensor output signal 888 in a so-called two-wire arrangement, in the form of current pulses on the sensor power connections (i.e., on a VCC connection 824 and a GND connection 826).

The digital controller 870 is configured to generate the sensor output signal 888 based on a comparison of the digital magnetic field signal 840a, 840b to threshold values, such as the above-described threshold values 414, 416, 418 in order to thereby encode target speed and other information. More particularly, the controller output signal 844 includes transitions occurring at switch points having a predetermined relationship with respect to the digital magnetic field signal crossing the threshold values.

Movement speed of the target 828 can be detected in accordance with the frequency of the binary signal or pulses as applicable (i.e., speed pulses). A direction of rotation of the target 828 can be determined based on a relative phase or relative time difference (e.g., lag or lead) of a particular edge transition of detector output signals associated with the phase separated magnetic field signals 840a, 840b.

Additional elements of the sensor 800 can include a memory device, as may take the form of an EEPROM 890, an oscillator 892, and a diagnostics circuit 894. An ESD protection circuit 896 can be coupled between the power terminal 824 and ground terminal 826. A regulator 898 can provide power to circuitry of the sensor.

Target 828 can have a variety of forms, including, but not limited to a gear having gear teeth 828a-828c or a ring magnet having one or more pole pairs. Also, linear arrangements of objects that move linearly are possible. Magnetic field sensor 800 may take the form of a rotation detector to detect passing gear teeth, for example, gear teeth 828a-828c of a ferromagnetic gear or, more generally target object 828. A permanent magnet 848 can be placed proximate to the gear 828, resulting in fluctuations of a magnetic field proximate to the gear as the gear rotates so as to form a so-called "back-bias" arrangement.

Referring to FIG. 9, an exemplary magnetic field speed sensor 900 as may implement the above-described output signal protocol may take the form of a rotation detector to detect passing gear teeth, for example, gear teeth 912a-912c of a ferromagnetic gear or, more generally target 912. A permanent magnet 958 can be placed proximate to the gear 912, resulting in fluctuations of a magnetic field proximate to the gear as the gear rotates in a so-called "back-bias" arrangement.

The sensor 910 can have a first terminal 914 coupled to a power supply denoted as Vcc and a second terminal 916 coupled to a fixed voltage, for example, a ground voltage, denoted as GND. A third terminal 918 of sensor 910 permits communication of a sensor output signal 952 to circuits and systems external to the sensor. Sensor 910 can be considered a three-terminal device (i.e., a three-wire device) since it has third terminal 918 at which output signal 952 is provided. Sensor 910 can be provided in the form of an integrated circuit (IC), with terminals 914, 916, 918 provided by pins or leads of the IC.

The sensor 910 can include first, second, and third magnetic field sensing elements 920a, 920b, 920c, respectively, here shown to be Hall effect elements. The first Hall effect element 920a generates a first differential signal 924a, 924b, the second Hall effect element 920b generates a second differential signal 926a, 926b, and the third Hall effect element 920c generates a third differential signal 928a, 928b. The first differential signal 924a, 924b can be received by a first differential preamplifier 930a, the second differential signal 926a, 926b can be received by a second differential preamplifier 930b, and the third differential signal 928a, 928b can be received by a third preamplifier 930c.

First and second amplified signals 932a, 932b generated by the first and second differential preamplifiers 930a, 930b, respectively, are received by a "right" channel amplifier 934a and the second amplified signal 932b and a third amplified signal 932c generated by the second and third differential preamplifiers 930b, 930c, respectively, are received by a "left" channel amplifier 934b. Designations of "right" and "left" are arbitrary.

A signal 938a generated by the right channel amplifier 934a is received by a right channel detector circuit 936a and a signal 938b generated by the left channel amplifier 934b is received by a left channel detector circuit 936b. The signals 938a, 938b can be analog signals, generally sinusoidal in nature.

Taking the right channel detector circuit 936a as representative of both of the detector circuits 936a, 936b, the right channel detector circuit 936a includes a threshold detector circuit 940a coupled to receive the signal 938a. The threshold detector circuit 940a is configured to detect positive and negative peaks of the signal 938a, to identify a peak-to-peak value of the signal 938a, and to generate threshold signals 942a that, for example, takes on a first threshold value at forty percent of the peak-to-peak value of the signal 938a and a second threshold value at sixty percent of the peak-to-peak value of the signal 938a.

A comparator 944a is coupled to receive the threshold signals 942a and is also coupled to receive the signal 938a. As a result, the comparator 944a generates a signal 946a that has transitions when the signal 938a crosses the thresholds 942a. Signal 946a can be the same as or similar to the above-described controller output signal 356.

A signal 946b generated by the left channel detector circuit 936b is generated in the same way as the signal 946a. However, since the magnetic field sensing elements 920a, 920b contribute to the signal 946a, while the magnetic field sensing elements 920b, 920c contribute to the signal 946b, it should be appreciated that the signals 946a, 946b have edges that differ in time (which is equivalent to phase for a particular signal frequency, i.e., particular rotation speed).

Movement speed of the target 912 can be detected in accordance with the frequency of either of the phase separated channel signals 946a, 946b. In this way channel signals 946a, 946b can be considered to contain redundant target speed information. It should be appreciated that a direction of rotation of the target 912 may be determined from a relative phase or relative time difference (e.g., lag or lead) of a particular edge transition in the signal 946a compared with a particular corresponding edge transition in the signal 946b. Therefore, a relative lag or a lead of edges of the signals 946a, 946b can be used to identify the direction of rotation of the gear 912.

While the sensor 910 is shown to include the detector circuits 936a, 936b, each having a particular topology, described above as peak-to-peak percentage detectors (threshold detectors), it should be understood that any form of detectors may be used, such as peak-referenced detectors (peak detectors).

The sensor 910 can include an output protocol module 948 (that may be the same as or similar to output signal generator 360) coupled to receive and process the phase separated signals 946a, 946b and configured to generate output signal 953 (that may be the same as or similar to sensor output signal 310).

Figure 10:
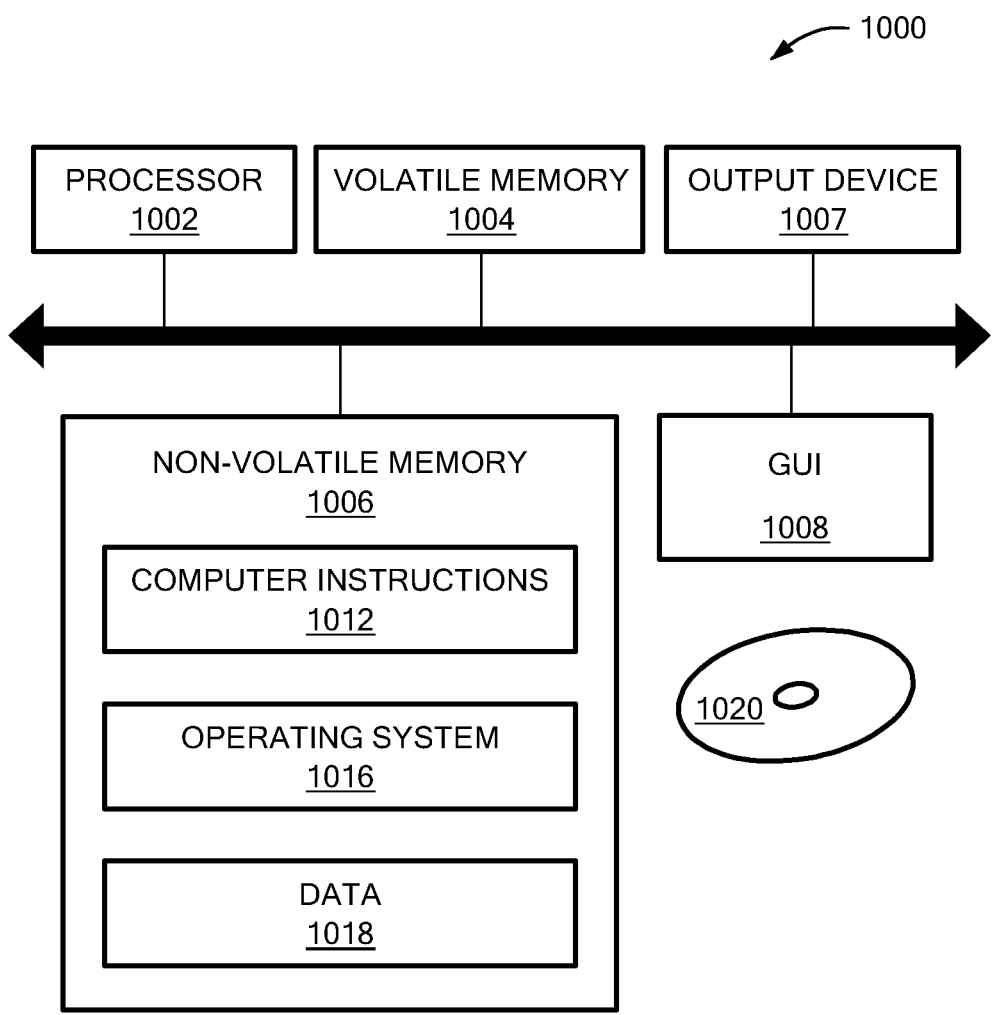
FIG. 10 a block diagram of an example computer system operative to perform processing, in accordance with the present disclosure.

FIG. 10 is a block diagram of an example computer system 1000 operative to perform processing, in accordance with the present disclosure. Computer system 1000 can perform all or at least a portion of the processing, e.g., steps in the algorithms and methods, described herein. The computer system 1000 includes a processor 1002, a volatile memory 1004, a non-volatile memory 1006 (e.g., hard disk, EEPROM, OTP memory, etc.), an output device 1007 and a user input or interface (UI) 1008, e.g., graphical user interface (GUI), a mouse, a keyboard, a display, and/or any common user interface, etc. The non-volatile memory (non-transitory storage medium) 1006 stores computer instructions 1012 (a.k.a., machine-readable instructions or computer-readable instructions) such as software (computer program product), an operating system 1016 and data 1018. In some examples, the computer instructions 1012 are executed by the processor 1002 out of (from) volatile memory 1004. In one embodiment, article 1020 (e.g., a storage device or medium such as a hard disk, an optical disc, magnetic storage tape, optical storage tape, flash drive, etc.) includes or stores the non-transitory computer-readable instructions.

As used herein, the term "magnetic field sensor" or simply "sensor" is used to describe a circuit that uses one or more magnetic field sensing elements, generally in combination with other circuits. The magnetic field sensor can be, for example, a rotation detector, a movement detector, or a proximity detector. A rotation detector (or movement detector) can senses passing target objects, for example, magnetic domains of a ring magnet or a ferromagnetic target (e.g., gear teeth) where the magnetic field sensor is used in combination with a back-bias or other magnet and can determine target movement speed. Ferromagnetic objects described herein can have a variety of forms, including, but not limited to, a ring magnet having one or more pole pair, and a gear having two or more gear teeth. Ferromagnetic gears are used in some examples below to show a rotating ferromagnetic object having ferromagnetic features, i.e., teeth. However, in other embodiments, the gear can be replaced with a ring magnet having at least one pole pair. Also, linear arrangements of ferromagnetic objects are possible that move linearly.

As used herein, the term "magnetic field sensing element" is used to describe a variety of electronic elements that can sense a magnetic field. The magnetic field sensing element can be, but is not limited to, a Hall effect element, a magnetoresistance element, a magnetotransistor, or an inductive coil. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate or in the plane of the substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of maximum sensitivity perpendicular to a substrate, while metal based or metallic magnetoresistance elements (e.g., GMR, TMR, AMR) and vertical Hall elements tend to have axes of maximum sensitivity parallel to a substrate.

As used herein, the term "magnetic field signal" is used to describe any signal that results from a magnetic field experienced by a magnetic field sensing element.

As used herein, the term "magnetic field sensor" or simply "sensor" is used to describe a circuit that uses one or more magnetic field sensing elements, generally in combination with other circuits. The magnetic field sensor can be, for example, a rotation detector, a movement detector, or a proximity detector. A rotation detector (or movement detector) can senses passing target objects, for example, magnetic domains of a ring magnet or a ferromagnetic target (e.g., gear teeth) where the magnetic field sensor is used in combination with a back-bias or other magnet and can determine target movement speed. Ferromagnetic objects described herein can have a variety of forms, including, but not limited to, a ring magnet having one or more pole pair, and a gear having two or more gear teeth. Ferromagnetic gears are used in some examples below to show a rotating ferromagnetic object having ferromagnetic features, i.e., teeth. However, in other embodiments, the gear can be replaced with a ring magnet having at least one pole pair. Also, linear arrangements of ferromagnetic objects are possible that move linearly.

As used herein, the terms "processor" and "controller" are used to describe elements that perform a function, an operation, or a sequence of operations. The function, operation, or sequence of operations can be hard coded into an electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory, in a discrete electronic circuit which can be analog or digital, and/or in special purpose logic circuitry (e.g., a field programmable gate array (FPGA)). Processing can be implemented in hardware, software, or a combination of the two. Processing can be implemented using computer programs executed on programmable computers/machines that include one or more processors, a storage medium or other article of manufacture that is readable by the processor (including volatile and non-volatile memory and/or storage elements), at least one input device and one or more output devices. Program code can be applied to data entered using an input device to perform processing and to generate output information. A processor or controller can contain internal processors or modules that perform portions of the function, operation, or sequence of operations. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

It should be understood that a so-called "comparator" can be comprised of an analog comparator having a two-state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

It is noted that various connections and positional relationships (e.g., over, below, adjacent, etc.) may be used to describe elements and components in the description and drawings. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, that includes a list of elements is not necessarily limited to only those elements but can include other elements not expressly listed or inherent to such apparatus, method, composition, mixture, or article.

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A magnetic field speed sensor, comprising:
a magnetic field sensing element operable to generate a magnetic field signal indicative of a magnetic field associated with a moveable target; and
a controller responsive to the magnetic field signal and configured to generate a controller output signal comprising a plurality of output words, each output word comprising a speed pulse and a plurality of data pulses capable of having four different amplitudes, wherein a time between the speed pulses of consecutive output words is indicative of the speed of movement of the target and wherein each data pulse corresponds to a data bit having a binary value represented by a transition direction of the data pulse and the amplitude of the data pulse.

2. The magnetic field speed sensor of claim 1, wherein a duration of each of the data pulses is programmable.

3. The magnetic field speed sensor of claim 1, wherein a duration of each of the data pulses is adjustable based on the speed of movement of the target.

4. The magnetic field speed sensor of claim 1, wherein the binary value of each data bit is independent of a time measurement.

5. The magnetic field speed sensor of claim 1, wherein the binary value of each data bit is determined based on a comparison of the amplitude of the data pulse to a high threshold level, a medium threshold level, and a low threshold level.

6. The magnetic field speed sensor of claim 1, wherein each data bit is associated with one or more of a direction of movement of the target, an air gap associated with the target, a temperature, and a fault condition associated with the sensor.

7. The magnetic field speed sensor of claim 1, wherein the controller comprises an encoder configured to compare the magnetic field signal to a threshold to generate the speed pulses and configured to generate the data pulses at an amplitude associated with a status received from one or more monitoring circuits or diagnostic circuits.

8. The magnetic field speed sensor of claim 1, further comprising an output signal generator configured to generate a sensor output signal as a current on a power connection of the sensor based on the controller output signal.

9. The magnetic field speed sensor of claim 1, further comprising an output signal generator configured to generate a sensor output signal as a voltage on an output pin of the sensor based on the controller output signal.

10. The magnetic field speed sensor of claim 1, wherein the magnetic field sensing element comprises a first magnetic field sensing element and the magnetic field signal comprises a first magnetic field signal and wherein the magnetic field speed sensor further comprises a second magnetic field sensing element operable to generate a second magnetic field signal, wherein the controller output signal is based on the first magnetic field signal and the second magnetic field signal.

11. The magnetic field speed sensor of claim 1, wherein the magnetic field sensing element comprises one or more Hall effect elements or magnetoresistance elements.

12. The magnetic field speed sensor of claim 1, further comprising a back bias magnet to generate a magnetic field, wherein the target comprises a ferromagnetic object and wherein movement of the target affects the magnetic field detected by the magnetic field sensing element.

13. The magnetic field speed sensor of claim 1, wherein a duration of the speed pulse is programmable.

14. The magnetic field speed sensor of claim 1, wherein a duration of the speed pulse is adjustable based on the speed of movement of the target.

15. A method of communicating an output signal of a magnetic field speed sensor, comprising:

generating, by the magnetic field sensor, a magnetic field signal indicative of a magnetic field associated with a target;

generating, by a controller in the magnetic field sensor, a controller output signal comprising a plurality of output words, each output word comprising a speed pulse and a plurality of data pulses capable of having four different amplitudes;

generating a sensor output signal by the magnetic field sensor based on the controller output signal; and determining a binary value of each data bit represented by a transition direction of the data pulse and the amplitude of the data pulse.

16. The method of claim 15, further comprising programming a duration of each of the data pulses.

17. The method of claim 15, further comprising adaptively adjusting a duration of each of the data pulses based on the speed of movement of the target.

18. The method of claim 15, wherein generating the controller output signal comprises comparing the magnetic field signal to a threshold to generate the speed pulses.

19. The method of claim 15, wherein generating the controller output signal comprises responding to one or more monitoring circuits and one or more diagnostic circuits to generate the plurality of data pulses.

20. The method of claim 15, wherein generating the sensor output signal comprises applying a current to a power connection of the magnetic field speed sensor based on the controller output signal.

21. The method of claim 15, wherein generating the sensor output signal comprises applying a voltage to an output pin of the sensor based on the controller output signal.

22. The method of claim 15, wherein determining the binary value of each data bit comprises comparing the amplitude of the data pulse to a high threshold level, a medium threshold level, and a low threshold level.

* * * * *